(12) United States Patent
Yoshiyama et al.

(10) Patent No.: US 7,254,727 B2
(45) Date of Patent: Aug. 7, 2007

(54) INFORMATION PROCESSOR WITH SUPPRESSED CACHE COHERENCE IN LOW POWER MODE

(75) Inventors: Noritoshi Yoshiyama, Yokohama (JP); Seiichi Kawano, Kanagawa (JP); Hirohide Komiyama, Kanagawa (JP); Tetsuji Nakamura, Yokohama (JP)

(73) Assignee: Lenovo Singapore Pte Ltd, Singapore (SG)

( * ) Notice: Subject to any disclaimer, the term of this patent is extended or adjusted under 35 U.S.C. 154(b) by 403 days.

(21) Appl. No.: 10/730,672

(22) Filed: Dec. 8, 2003

(65) Prior Publication Data

US 2005/0060591 A1    Mar. 17, 2005

(30) Foreign Application Priority Data

Mar. 13, 2003    (JP) .............................. 2003-068272

(51) Int. Cl.
*G06F 1/32*    (2006.01)
*G06F 1/00*    (2006.01)
(52) U.S. Cl. ...................................... 713/320; 713/300
(58) Field of Classification Search ................ 713/320, 713/300; 711/141
See application file for complete search history.

(56) References Cited

U.S. PATENT DOCUMENTS

| | | | | |
|---|---|---|---|---|
| 4,680,730 A * | 7/1987 | Omoda et al. .............. 711/169 |
| 5,125,084 A * | 6/1992 | Begun et al. ................. 712/33 |
| 5,157,774 A * | 10/1992 | Culley ......................... 711/139 |
| 5,210,850 A * | 5/1993 | Kelly et al. ................. 710/220 |
| 5,481,731 A * | 1/1996 | Conary et al. .............. 711/141 |
| 6,014,751 A * | 1/2000 | Kardach et al. ............ 713/324 |

\* cited by examiner

*Primary Examiner*—Thomas Lee
*Assistant Examiner*—Ji H Bae
(74) *Attorney, Agent, or Firm*—Lally & Lally; Carlos Munoz-Bustamante

(57) ABSTRACT

An information processor having a normal-operation mode in which coherence control is performed for making data in a cache memory of a processor identical to data in a main memory and a power-saving mode in which the coherence control is suppressed to lower the power consumption from power consumption in the normal-operation mode and entering the normal-operation mode when an input/output device accesses the main memory in the power-saving mode includes an attribute setting module for setting a device area of the main memory, accessed by the input/output device of the information processor to a non-cacheable attribute for exempting said device area from said coherence control even in the normal-operation mode; an operation mode setting module for allowing the input/output device to access the device area while keeping the operation mode of the information processor in the power-saving mode when the input/output device requests access to the device area in the power-saving mode.

9 Claims, 6 Drawing Sheets

INFORMATION PROCESSOR WITH SUPPRESSED CACHE COHERENCE IN LOW POWER MODE

FIELD AND BACKGROUND OF INVENTION

The present invention relates to an information processor, program, storage medium, and control circuit and, in particular, to an information processor, program, storage medium, and control circuit that provides a power saving function.

In recent years, power saving technology for increasing battery-powered operating time of portable information processing terminals has been receiving attention. For instance, a technology that changes power consumption according to the amount of computation has been used. This is shown, for example, in the "Advanced Configuration and Power Interface Specification Revision 2.0a" (Mar. 31, 2002; Compaq Computer Corporation and four other companies).

A conventional information processing terminal including ACPI capabilities has a normal-operation mode in which coherence control is performed for making data in a processor cache memory identical to data in a main memory and a power-saving mode in which the coherence control is suppressed to lower power consumption from power consumption in normal-operation mode. However, when an input/output device accesses the main memory to perform bus master transfer, the information processing terminal cannot be placed in the power-saving mode because coherence between the cache memory and the main memory would be lost. To solve this problem, an information processor has been proposed that always operates in normal-operation mode. However, such an information processor has the problem of consuming a large amount of power. Another approach has been proposed that flashes a cache memory immediately before the information processor enters power-saving mode. However, this approach has the problem that the cache memory flashing takes long time (for example, a processor requires 80 to 400 microseconds).

It is, therefore, a purpose of the present invention to provide an information processor, program, storage medium, and control circuit that can solve these problems. The purpose is achieved by the combination of features set forth in the independent claims herein. The dependent claims define preferable, specific embodiments of the present invention.

SUMMARY OF THE INVENTION

According to a first embodiment of the present invention, there are provided an information processor, a program for causing the information processor to operate, a storage medium on which the program is stored, and a control circuit for controlling the information processor. The information processor has a normal-operation mode in which coherence control is performed for making data in a processor cache memory identical to data in a main memory and a power-saving mode in which coherence control is suppressed to lower power consumption from power consumption in the normal-operation mode and enters the normal-operation mode when an input/output device accesses the main memory in the power-saving mode. The information processor comprises an attribute setting module for setting a device area of said main memory that is accessed by the input/output device of the information processor to the non-cacheable attribute for exempting the device area from coherence control even in the normal-operation mode, and an operation mode setting module for allowing the input/output device to access the device area while keeping the operation mode of the information processor in said power-saving mode when the input/output device requests access to the device area in the power-saving mode.

The summary of the present invention provided above is not a complete list of the essential features of the present invention. Sub-combinations of the features are also included in the present invention.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
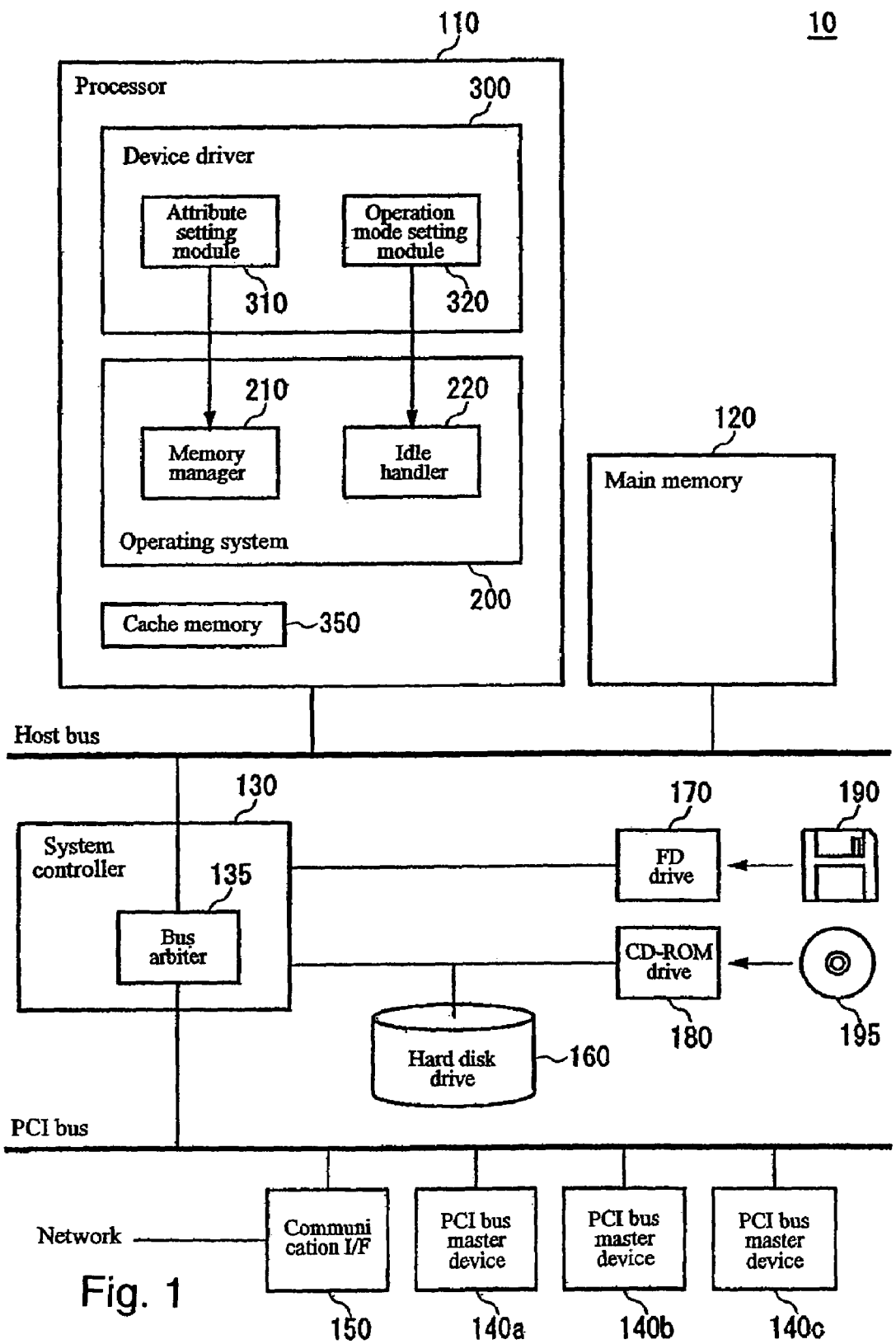
FIG. 1 shows a functional block diagram of an information processor 10.

FIG. 1 shows a functional block diagram of an information processor 10. The information processor 10 has a number of operation modes that provide different amounts of power consumption in order to maintain a low-power-consumption mode even when a device accesses a memory. The information processor 10 comprises a processor 110, a main memory 120, a system controller 130, a bus arbiter 135, PCI bus master devices 140a to 140c, each of which is an exemplary input/output device, a communication interface 150, a hard disk drive 160, a floppy disk drive 170, and a CD-ROM drive 180. The information processor 10 further comprises a device driver 300 and an operating system 200 stored in the main memory 120 and executed by the processor 110.

The processor 110 controls the components of the information processor 10 according to programs stored in the main memory 120. The processor 110 has a cache memory 350 for storing data read from the main memory 120 and performs coherence control for making data in cache memory 350 identical to data in the main memory 120.

The main memory 120 outputs data it stores to the processor 110 or one of the PCI bus master devices 140a to 140c. The main memory 120 stores data received from the processor 110 or one of the PCI bus master devices 140a to 140c. Furthermore, the main memory 120 receives and stores a program or data from the hard disk drive 160, floppy disk drive 170, or the CD-ROM drive 180 through the processor 110.

The system controller 130 interconnects a host bus onto which the processor 110 and the main memory 120 are connected, a PCI bus onto which the PCI bus master devices 140a to 140c and communication interface 150 are connected, the hard disk drive 160, the floppy disk drive 170, and the CD-ROM drive 180. The system controller 130 has the bus arbiter 135. The bus arbiter 135 receives a memory access request signal that is provided from each of a number of input/output devices, for example PCI bus master devices 140a to 140c in order to access the main memory 120. The bus arbiter 135 allows one of the PCI bus master devices 140a to 140c to access the main memory 120.

The PCI bus master device 140a is a device that controls inputs from and outputs to external devices. It may be a device for controlling a USB mouse, for example. The PCI bus master device 140a controls the inputs and outputs according to instructions from the device driver 300. The PCI bus master device 140a accesses the main memory 120 as necessary. The PCI bus master devices 140b and 140c are similar to the PCI bus master device 140a and the description of which will be omitted.

The communication interface 150 communicates with other devices over a network. The hard disk drive 160 stores programs and data used by the information processor 10. The CD-ROM drive 180 reads a program or data from a CD-ROM 195 and provides it to the main memory 120 through the system controller 130. The floppy disk drive 170 reads a program or data from a floppy disk 190 and provides it to the main memory 120 through the system controller 130.

The operating system 200 has an idle handler 220 that changes the operation mode of the information processor 10 according to the state of the information processor 10 and a memory manager 210 that manages the main memory 120. In particular, the information processor 10 has a normal-operation mode in which coherence control is performed for making data in the cache memory 350 identical to data in the main memory 120 and a power-saving mode in which the coherence control is suppressed to lower power consumption from that in the normal-operation mode. The idle handler 220 causes the information processor 10 to switch one mode to the other. For example, when the idle handler 220 receives in the power-saving mode an access request signal provided from one of the PCI bus master devices 140a to 140c attempting to access the main memory 120, the idle handler 220 places the information processor 10 in the normal-operation mode. On the other hand, the idle handler 220 places the information processor 10 in the power-saving mode after the processor 110 is idle for a predetermined period of time in the normal-operation mode. Furthermore, the idle handler 220 changes conditions for switching the operation mode by changing the value of a register in the bus arbiter 135 according to an instruction from an operation mode setting module 320.

The normal-operation mode herein may be an operation mode such as the C0 processor power state, C1 processor power state, or C2 processor power state described in non-patent literature 1 in which coherence control is performed. The power-saving mode herein may be an operation mode such as the C3 processor power state or C4 processor power state described in non-patent literature 1 in which coherence control is suppressed.

When the memory manager 210 receives an area reservation instruction for reserving a device area that is accessed by the PCI bus master device 140a from the attribute setting module 310, the memory manager 210 associates and allocates an area in the main memory 120 with and to the PCI bus master device 140a. When the memory manager 210 receives from the attribute setting module 310 an attribute setting instruction for setting the device area to the non-cacheable attribute that exempts the device area from coherence control even in said normal-operation mode, the memory manager 210 sets the area in the main memory 120 to the non-cacheable attribute. For example, the memory manager 210 sets the device area to the non-cacheable attribute by overriding a cache attribute in a page table entry of the device area. Furthermore, when the memory manager 210 receives an attribute setting instruction for setting a cacheable attribute that requires coherence control in the normal-operation mode, the memory manager 210 may set the area in the main memory 120 to the cacheable attribute.

The device driver 300, which is an example of a program according to the present invention, has the attribute setting module 310 and the operation mode setting module 320. The attribute setting module 310 sends an area reservation instruction to the memory manager 210 in response to a command from a user when a new PCI bus master device 140a, for example, is connected to the information processor 10. The attribute setting module 310 sends an attribute setting instruction for setting a device area to the non-cacheable attribute to the memory manager 210 to set the device area to the non-cacheable attribute. In response to this, the operation mode setting module 320 sends to the idle handler 220 a condition change instruction for changing the condition for switching between the operation modes, in particular, an instruction for retaining the power-saving mode even if the PCI bus master device 140a requests access to the device area. Consequently, the operation mode setting module 320 can allow the PCI bus master device 140a to access the device area while maintaining the power-saving mode.

In this way, the information processor 10 sets a device area of the main memory 120 which the PCI bus master device 140a accesses to the non-cacheable attribute to avoid the need for cache coherence control. When the PCI bus master device 140a requests access to that device area, the information processor 10 maintains the power-saving mode. Thus, the information processor 10 can reduce power consumption while maintaining coherence between data in the main memory 120 and the cache memory 350.

The program to be provided to the information processor 10 is stored on a storage medium such as a floppy disk 190, a CD-ROM 195, an optical storage medium such as a DVD and PD, a magneto-optical storage medium such as an MD, a tape, or a semiconductor memory such as an IC card, and provided by a user to the information processor 10. Alternatively, a storage device such as a hard disk or a RAM provided in a server system connected to a private communication network or the Internet may be used as a storage medium to provide the program to the information processor 10 through the network and the communication interface 150.

The program described above has an attribute setting module, an operation mode setting module, a memory manager module, and an idle handler module. These modules cause the information processor 10 to perform the same operations that are performed by their corresponding components of the information processor 10, which will be described with reference to FIGS. 1 to 6. The description of these program modules therefore will be omitted herein.

Figure 2:
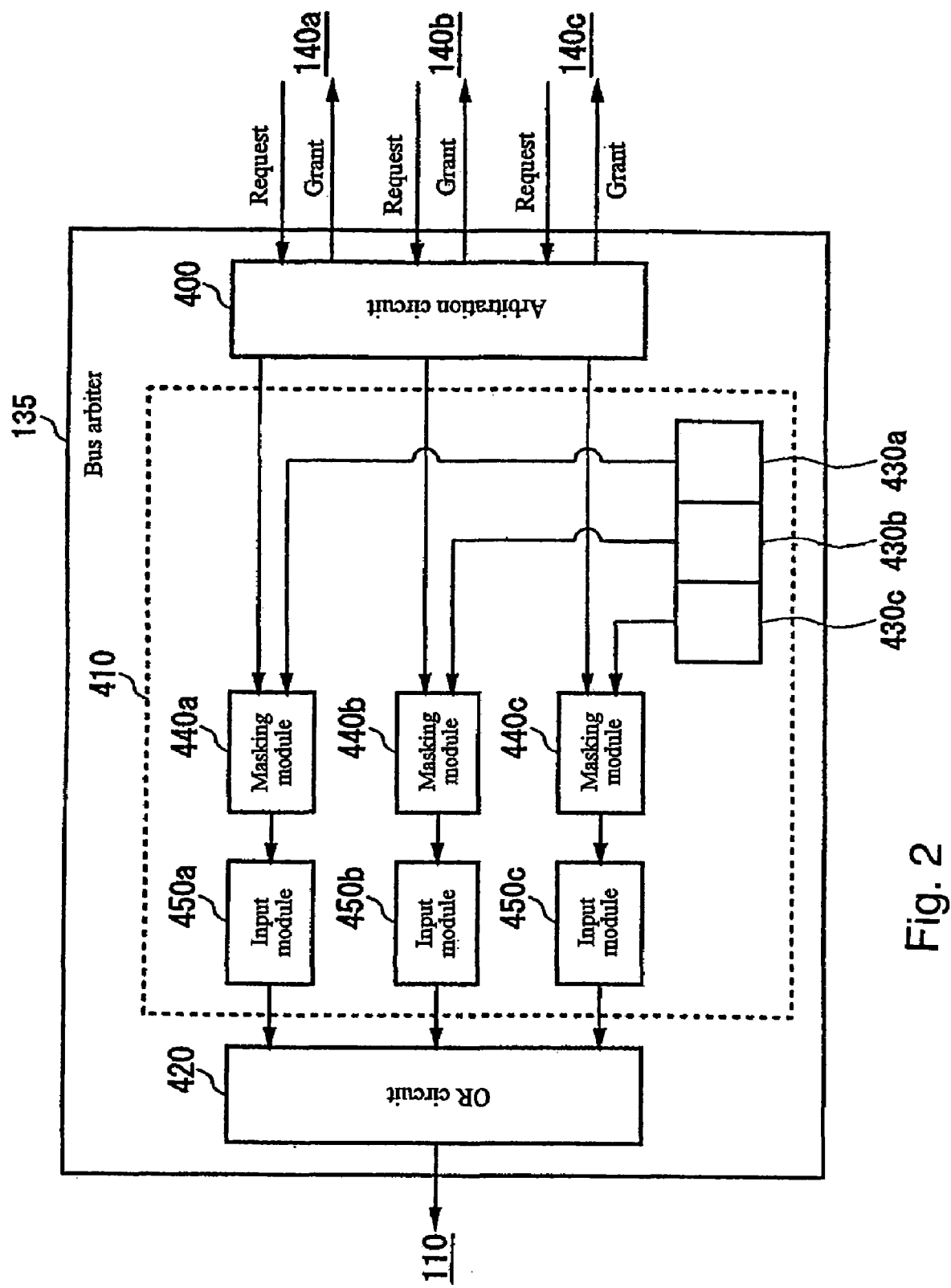
FIG. 2 shows a block diagram of a bus arbiter 135.

FIG. 2 shows a block diagram of the bus arbiter 135. With reference to FIG. 2, a method performed by the bus arbiter 135 for setting an operation mode switching condition for each input/output device will be described. The bus arbiter 135 has an arbitration circuit 400 that performs host bus arbitration among the PCI bus master devices 140a to 140c, a control circuit 410 that controls operation mode switching, and an OR circuit 420 that receives an access request signal from any of the PCI bus master devices 140a to 140c and outputs it to the processor 110. When the arbitration circuit 400 receives a request signal, which is an example of an access request signal, from each of the PCI bus master devices 140a to 140c, the arbitration circuit 400 provides a grant signal for granting communication over the host bus to one of the PCI bus master devices 140a to 140c. As a result, the PCI bus master device 140 that receives the grant signal can access the main memory 120. The arbitration circuit 400 provides the request signal received from the PCI bus master device 140 to which it has granted the host bus communication to one of masking modules 440a to 440c. The OR circuit 420 provides the logical OR of requests signal received from the control circuit 410 to the processor 110 through a control LSI as a bus master status, for example.

The control circuit 410 has register modules 430a to 430c for storing a plurality of pieces of mask data associated with the respective PCI bus master devices 140a to 140c, masking modules 440a to 440c for masking access request signals, and input modules 450a to 450c for inputting the masked signals to the processor 110. The register module 430a is associated with the PCI bus master device 140a and stores mask data for specifying whether or not an access signal request from the PCI bus master device 140a is disabled. The register modules 430b and 430c are substantially the same as the register module 430a, except that the register module 430b and the register module 430c are associated with the PCI bus master devices 140b and 140c, respectively, and therefore the description of which will be omitted.

The masking modules 440a to 440c obtain an access request signal from each input/output device from the arbitration circuit 400, masks the access request signal, and outputs it to the input modules 450a to 450c. In particular, the masking module 440a obtains an access request signal from the arbitration circuit 400 that is issued by the PCI bus master device 140a, masks the access request signal with mask data associated with the PCI bus master device 140a and stored in the register module 430a, and provides the masked access request signal to the input module 450a. The masking modules 440b and 440c are substantially the same as the masking module 440a, except that the masking modules 440b and 440c are associated with the PCI bus master devices 140b and 140b, the register modules 430b and 430c, and the input modules 450b and 450c, respectively, and therefore the description of which will be omitted.

The input modules 450a to 450c input the signals masked by the masking modules 440a to 440c into the idle handler 220 running on the processor 110 to change the operation mode of the information processor 10.

Consequently, the operation mode setting module 320 can associate mask data disabling the access request signal with the PCI bus master device 140a, which is an input/output device accessing the device area and store it in the register module 430a to maintain the information processor 10 in the power-saving mode.

On the other hand, the operation mode setting module 320 associates and stores mask data that enables an access request signal with the PCI bus master device 140b and in the register module 430b. Thus, when a device other than the PCI bus master device 140a, the PCI bus master device 140b in this example, attempts to access an area in the main memory 120 with the cacheable attribute which requires coherence control in the normal mode, the operation mode setting module 320 can change the operation mode of the information processor 10 to the normal-operation mode.

A cacheable attribute is set on a memory area and indicates that the processor 110 should apply coherence control to that area in the normal-operation mode. For example, when the PCI bus master device 140b writes to an area for which the cacheable attribute is set, the processor 110 first determines whether or not the data in that area is stored in the cache memory 350. If the data in that area is stored in the cache memory 350, the processor 110 performs coherence control so as to invalidate the data in the cache memory 350. In short, the cacheable attribute is set on a memory area and indicates that the data in that area is stored in the cache memory 350, and, when a change is made to that data, the processor 110 performs coherence control.

In an alternative configuration to the one shown in FIG. 2, the arbitration circuit 400 may receive access request signals from input/output devices sequentially through a serial input. In that case the masking modules 440a to 440c may sequentially mask the received access request signals and send them to the OR circuit 420 through the input modules 450a to 450c.

Figure 3:
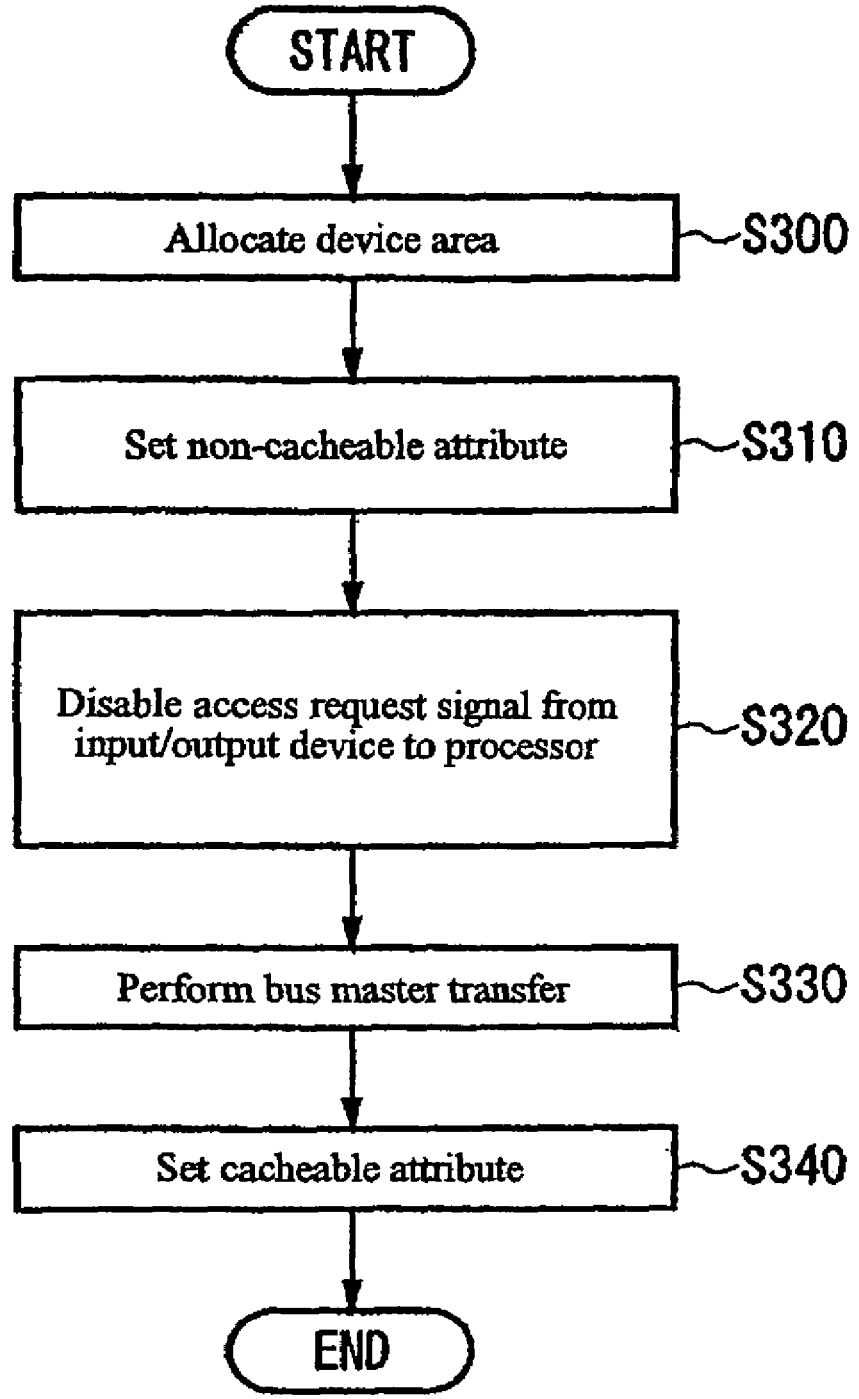
FIG. 3 shows a flowchart of a process performed by a device driver 300.

FIG. 3 shows a flowchart of a process performed by the device driver 300. The attribute setting module 310 sends an area reservation instruction to the memory manager 210 to reserve a device area to be accessed by the PCI bus master device 140a (S300). The attribute setting module 310 then sends an attribute setting instruction to the memory manager 210 to set the device area to the non-cacheable attribute (S310). Then, the operation mode setting module 320 sends a condition change instruction to the idle handler 220 to disable an access request signal provided from the PCI bus master device 140a to the processor 110 (S320).

The operation mode setting module 320 then causes the PCI bus master device 140a to perform bus master transfer. That is, it allows the PCI bus master device 140a to access the device area (S330). On the completion of the bus master transfer, the attribute setting module 310 sends an attribute setting instruction to the memory manager 210 to set the device area to the cacheable attribute (S340).

Figure 4:
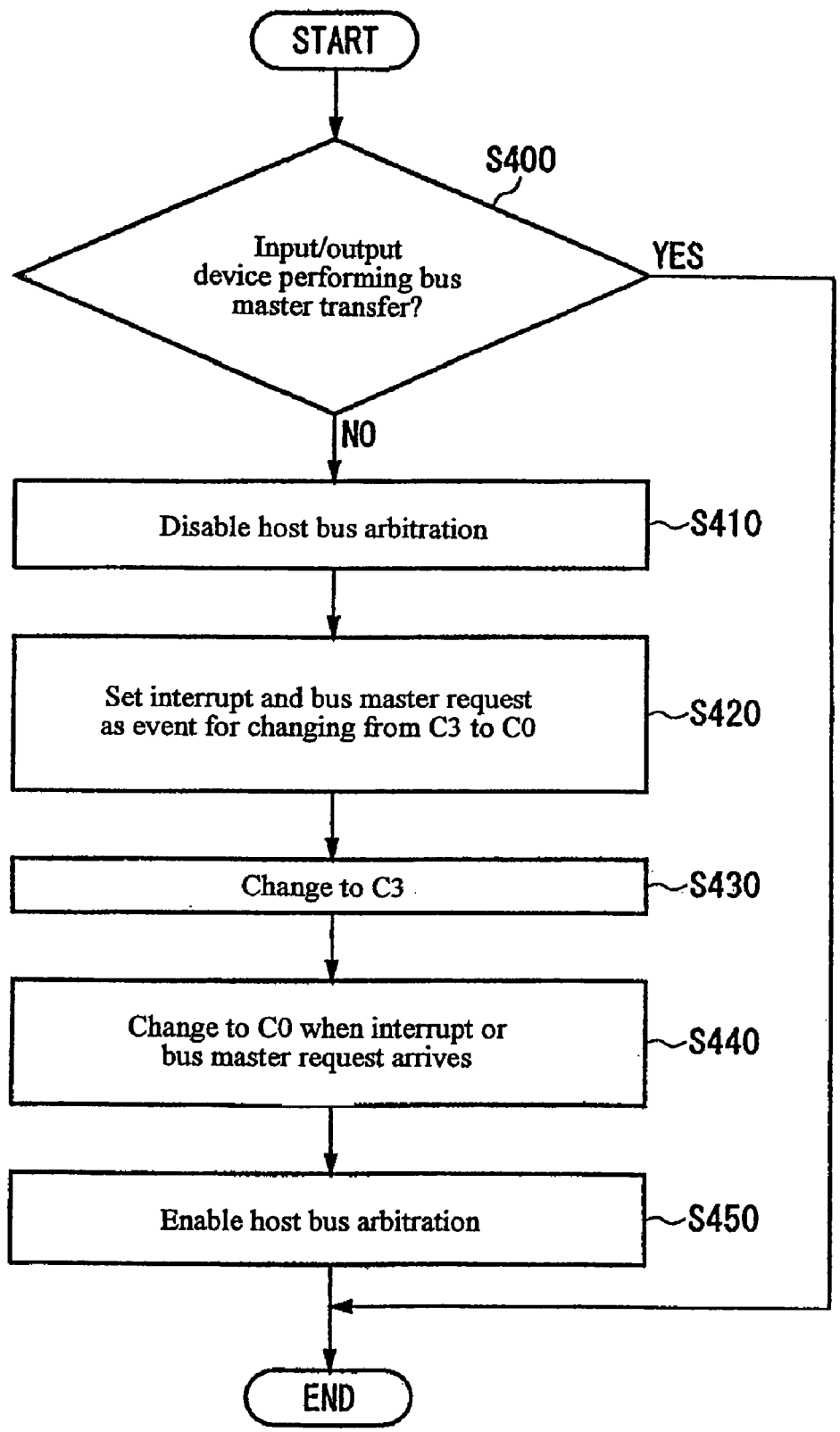
FIG. 4 shows a flowchart of a process performed by an operating system 200.

FIG. 4 shows a flowchart of a process performed by the operating system 200. The idle handler 220 performs the process shown in FIG. 4 if, for example, the processor 110 is idle for a predetermined period of time. If bus master transfer that is access to from the PCI bus master device 140a to the main memory 120 is being performed (S400: YES), the idle handler 220 ends the process. On the other hand, if the bus master transfer is not performed (S400: NO), the idle handler 220 disables host bus arbitration (S410). As a result, only the processor 110 can use the host bus for communication and the idle handler 220 can prevent the PCI bus master devices 140a to 140c from using the host bus for communication. For example, the idle handler 220 sets the ARB_DIS bit in a system based on the ACPI (Advanced Configuration and Power Interface) specification. Alternatively, the idle handler 220 may call the API of the operating system 20 to disable host bus arbitration.

In response to a condition change instruction from the operation mode setting module 320, the idle handler 220 then sets an interrupt signal input into the processor 110 and an access request (bus master request, for example) from the PCI bus master devices 140a to 140c for accessing the main memory 120 as the conditions for changing from the C3 processor power state to the C0 processor power state (S420). For example, the idle handler 220 sets the BM_RLD bit in an ACPI-based system to set an event for changing the processor power state. Then the idle handler 220 changes the operation mode to the C3 processor power state (S430).

When the idle handler 220 receives an interrupt or a bus master request, it changes the operation mode to the C0 processor power state (S440). Then, the idle handler 220 enables the host bus arbitration (S450).

In this way, according to the present embodiment, the information processor 10 allows a preset device, the PCI bus master device 140a for example, to access a device area, while maintaining the power-saving mode. This allows the information processor 10 to reduce the power consumption.

On the other hand, when a device other than the PCI bus master device 140a, for example the PCI bus master device 140b accesses an area in the main memory 120 with the cacheable attribute requiring coherence control in the normal-operation mode, the operation mode setting module 320 can change the operation mode to the normal-operation mode. This allows the information processor 10 to control coherence between data in the main memory 120 that is accessed by the PCI bus master device 140b and data in the cache memory 350.

Figure 5:
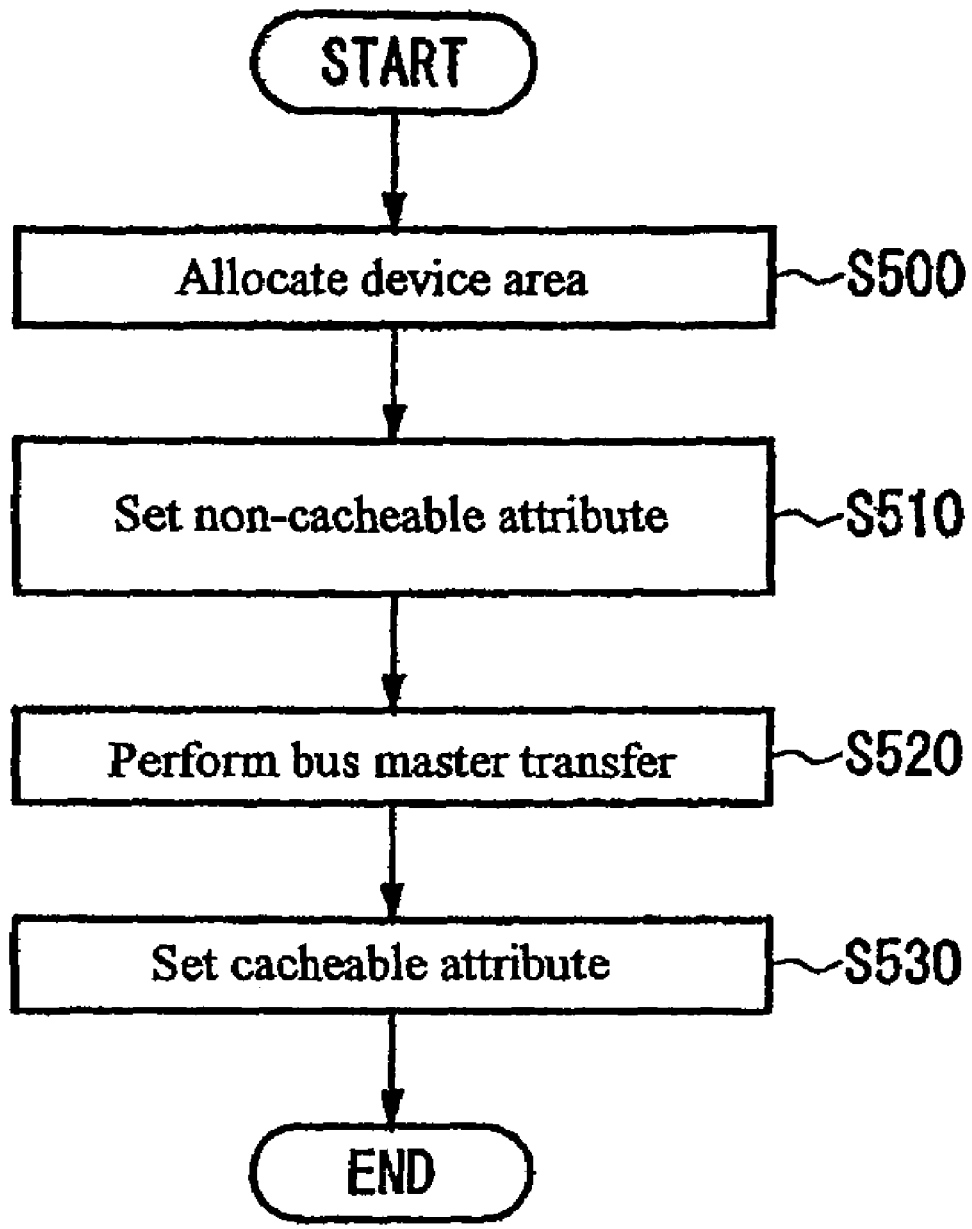
FIG. 5 shows a flowchart of a process performed by a device driver 300 according to a variation.

FIG. 5 shows a flowchart of a process performed by the device driver 300 according to a variation of the embodiment. Unlike the bus arbiter 135 in FIG. 2, a bus arbiter 135 of an information processor 10 in this embodiment does not have to include a control circuit 410. The configuration of the information processor 10 in the embodiment is substantially the same as that of the information processor 10 shown in FIGS. 1 and 2. Therefore only differences will be described.

An attribute setting module 310 sends an area reservation instruction to a memory manager 210 to reserve a device area to be accessed by PCI bus master devices 140a to 140c (S500). The attribute setting module 310 then sends an attribute setting instruction to a memory manager 210 to set the device area to the non-cacheable attribute (S510).

Then the operation mode setting module 320 causes the PCI bus master devices 140a to 140c to perform bus master transfer, namely access to the device area (S520). On the completion of the bus master transfer, the attribute setting module 310 can send an attribute setting instruction to the memory manager 210 to set the device area to the cacheable attribute (S530).

Figure 6:
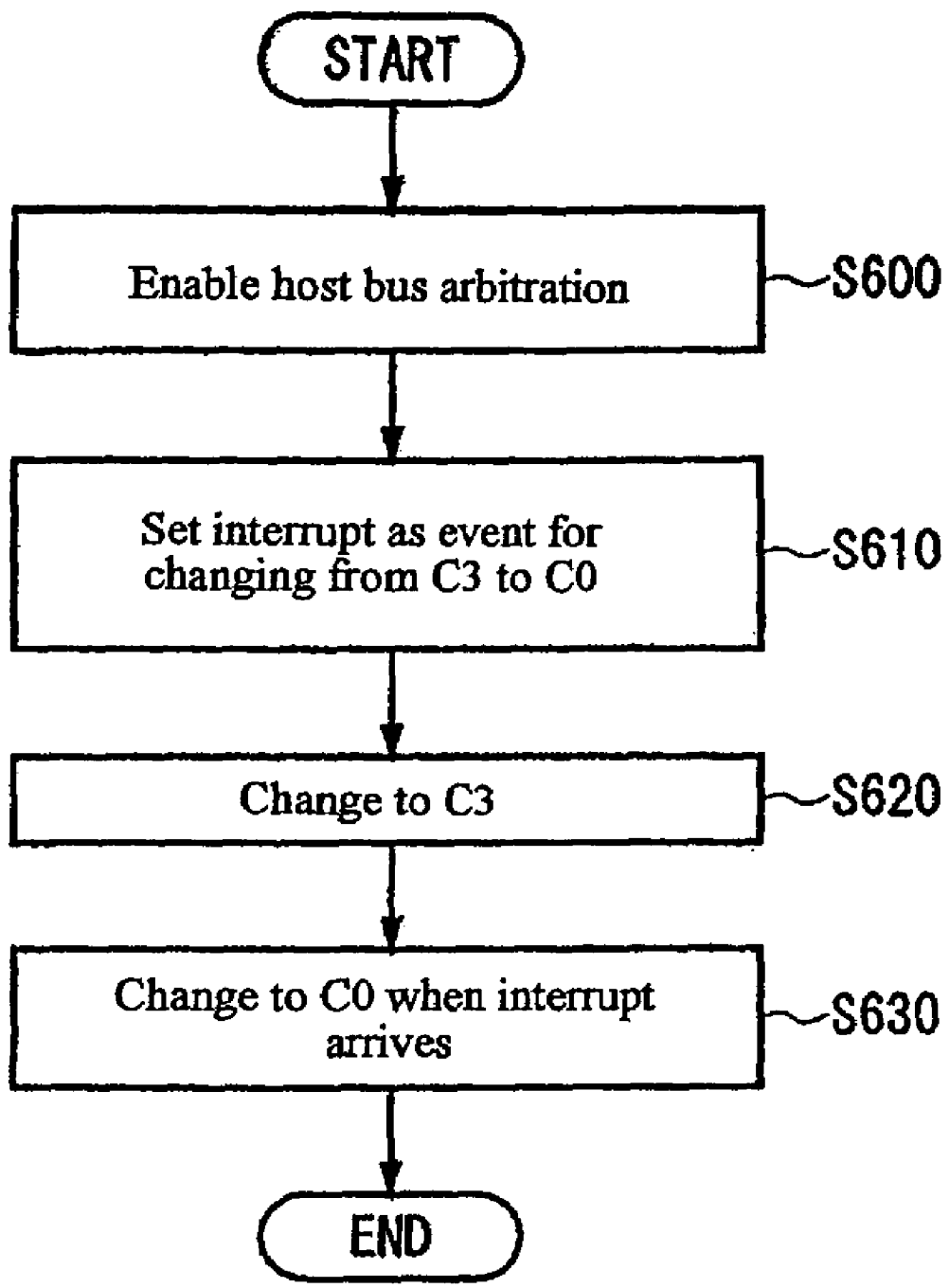
FIG. 6 shows a flowchart of a process performed by an operating system 200 according to the variation.

FIG. 6 shows a flowchart of a process performed by an operating system 200 according to the variation. An idle handler 220 performs the process shown in FIG. 6 if a processor 110 is idle for a predetermined period of time. The idle handler 220 enables host bus arbitration (S600). If host bus arbitration has already been enabled, the idle handler 220 does not perform any process at step S600. The idle handler 220 enables host bus arbitration by clearing the ARB_DIS bit in an ACPI-based system, for example.

In response to a condition change instruction from an operation mode setting module 320, the idle handler 220 sets an interrupt signal input into the processor 110 as a condition for switching from the C3 processor power state to the C0 processor power state (S610). For example, the idle handler 220 sets only an interrupt signal input as the event for changing from the C3 processor power state to the C0 processor power state by clearing the BM_RLD bit in the ACPI-based system. This allows the operation mode setting module 320 to disable an access request signal from any of the PCI bus master devices 140a to 140c. The idle handler 220 changes the operation mode to the C3 processor power state (S620). When the idle handler 220 subsequently receives an interrupt, it changes the operation mode to the C0 processor power state (S630).

In this way, according to this embodiment, the operation mode setting module 320 can disable an access request signal from any of the PCI bus master devices 140a to 140c to allow all input/output devices to access device areas, while maintaining the power-saving mode of the information processor 10. The information processor 10 causes almost no loss in the efficiency of memory access if the frequency with which the processor 120 accesses the device area is low. Furthermore, the information processor 10 can maintain the power-saving mode regardless of access from the input/output devices. Consequently, power consumption can be reduced.

The present invention has been described with respect to embodiments thereof, the technical scope of the present invention is not limited to the embodiments. Various changes or improvements can be made to the embodiments. It will be appreciated from the claims that embodiments to which such changes or improvements are made also fall in to the technical scope of the present invention. For example, the information processor 10 may switch between the process described in the embodiment and the process in the variation, according to a policy set by a user. In particular, the information processor 10 may perform the process described in the variation when a policy that attempts to minimize power consumption is set, and perform the process described in the embodiment when a policy that attempts to provide balance between processing speed and power consumption is set.

In the drawings and specifications there has been set forth a preferred embodiment of the invention and, although specific terms are used, the description thus given uses terminology in a generic and descriptive sense only and not for purposes of limitation.

What is claimed is:

1. An information processor comprising:
    a main memory;
    an processor operatively coupled to said main memory and having (a) a normal-operation mode in which coherence control is performed for making data in a cache memory of said processor identical to data in a main memory and (b) a power-saving mode in which coherence control is suppressed to lower the power consumption from the power consumption of the processor when in said normal-operation mode, said processor entering said normal-operation mode when an input/output device accesses main memory while said processor is in said power-saving mode;
    an attribute setting module for setting a device area of said main memory to a non-cacheable attribute for exempting said device area from coherence control even in said normal-operation mode, said device area being an area of said main memory accessed by the input/output device; and
    an operation mode setting module for allowing said input/output device to access said device area while keeping the operation mode of said information processor in said power-saving mode when said input/output device requests access to said device area in said power-saving mode.

2. The information processor according to claim 1, wherein if a device different from said input/output device accesses an area in said memory that is set to a cacheable attribute requiring said coherence control in said normal-operation mode, said operation mode setting module changes the operation mode of said information processor to the normal-operation mode.

3. The information processor according to claim 1, wherein said input/output device comprises a first input/output device and wherein when said processor receives in said power-saving mode an access request signal provided from a second input/output device to access an area of said main memory other than said device area, said processor changes the operation mode of said information processor to said normal-operation mode.

4. The information processor according to claim 3, further comprising:
a register module for associating each of a plurality of pieces of mask data with each of a plurality of input/output devices and storing said mask data, said mask data specifying whether or not said access request signal received from each of said input/output device is invalidated;
a masking module for obtaining said access request signal for each input/output device and masking said access request signal with said mask data being associated with said input/output device and stored in said register module; and
an input module for inputting the input signal masked by said masking module into a processor to change the operation mode of said information processor;
wherein said operation mode setting module associates mask data invalidating said access request signal with said input/output device accessing said device area and stores said mask data in said register module to allow said input/output device to access said device area while keeping the operation mode of said information processor in said power-saving mode.

5. The information processor according to claim 3, wherein said operation mode setting module invalidates an access request signal from said first input/output device to allow said first input/output device to access said device area while keeping the operation mode of said information processor in said power-saving mode.

6. A computer program product comprising computer executable instructions, stored on a computer readable medium, for signaling an information processor having a normal-operation mode in which coherence control is performed for making data in a cache memory of a processor identical to data in a main memory and a power-saving mode in which said coherence control is suppressed to lower the power consumption from power consumption in said normal-operation mode, the computer program product comprising:
instructions for causing the information processor to enter said normal-operation mode when an input/output device accesses said main memory in said power-saving mode;
attribute setting instructions for setting a device area of said main memory to a non-cacheable attribute for exempting said device area from said coherence control even in said normal-operation mode, said device area being an area of the main memory accessed by the input/output device; and
operation mode setting instructions for allowing said input/output device to access said device area while keeping the operation mode of said information processor in said power-saving mode when said input/output device requests access to said device area in said power-saving mode.

7. The program product according to claim 6, wherein said input/output device comprises a first input/output device, said program product further comprising instructions for changing the operation mode of said information processor to said normal-operation mode when said processor receives in said power-saving mode an access request signal provided from a second input/output device to access an area of said main memory other than said device area.

8. The computer program product of claim 7, further comprising operation mode setting instructions to invalidate said access request signal to allow said first input/output device to access said device area while keeping the operation mode of said information processor in said power-saving mode.

9. A control circuit for controlling mode selection in an information processor having a normal-operation mode in which coherence control is performed for making data in a cache memory identical to data in a main memory and a power-saving mode in which said coherence control is suppressed to lower the power consumption from power consumption in said normal-operation mode and entering said normal-operation mode when an input/output device accesses said main memory in said power-saving mode, comprising:
a register module for storing mask data for each input/output device, said mask data indicating whether or not an access request signal provided by each of a plurality of input/output devices for accessing said main memory is invalidated;
a masking module for obtaining said access request signal for each input/output device and masking said access request signal with mask data associated with said input/output device and stored in said register module; and
an input module for entering a signal masked by said masking module into a processor to selectively switch the operation mode of said information processor.

* * * * *